United States Patent [19]

Brauer

[11] 4,002,935
[45] Jan. 11, 1977

[54] RECIPROCATING LINEAR MOTOR

[75] Inventor: John Robert Brauer, Milwaukee, Wis.

[73] Assignee: A. O. Smith Corporation, Milwaukee, Wis.

[22] Filed: May 15, 1975

[21] Appl. No.: 577,639

[52] U.S. Cl. .............................. 310/27; 417/416; 417/418

[51] Int. Cl.² ...................................... H02K 33/18

[58] Field of Search ................. 310/13, 27, 15, 17, 310/19; 417/417, 415, 416, 418; 62/115

[56] References Cited

UNITED STATES PATENTS

| 2,679,732 | 6/1954 | Dolz | 62/115 |
| 3,018,467 | 1/1962 | Harris | 310/27 X |
| 3,353,040 | 11/1967 | Abbott | 310/27 |
| 3,599,020 | 8/1971 | Harris et al. | 310/27 X |

Primary Examiner—Donovan F. Duggan
Attorney, Agent, or Firm—Andrus, Sceales, Starke & Sawall

[57] ABSTRACT

A linear motor is operatively connected to operate a pair of axially aligned compressors. A pair of axially spaced and oppositely wound coils are mounted to a cylindrically shaped coil form movably connected to drive the aligned compressors with the coils serially connected to a single phase A.C. power source. A pair of spaced annular magnets provide a pair of annular poles of opposite polarity spaced immediately adjacent to the pair of coils while an outer annular flux conducting member connects the outer radial portions of the annular magnets. One embodiment spaces the pair of compressors at opposite axial extremities of the linear motor construction while a second embodiment centers the compressors within the movable coil form.

6 Claims, 4 Drawing Figures

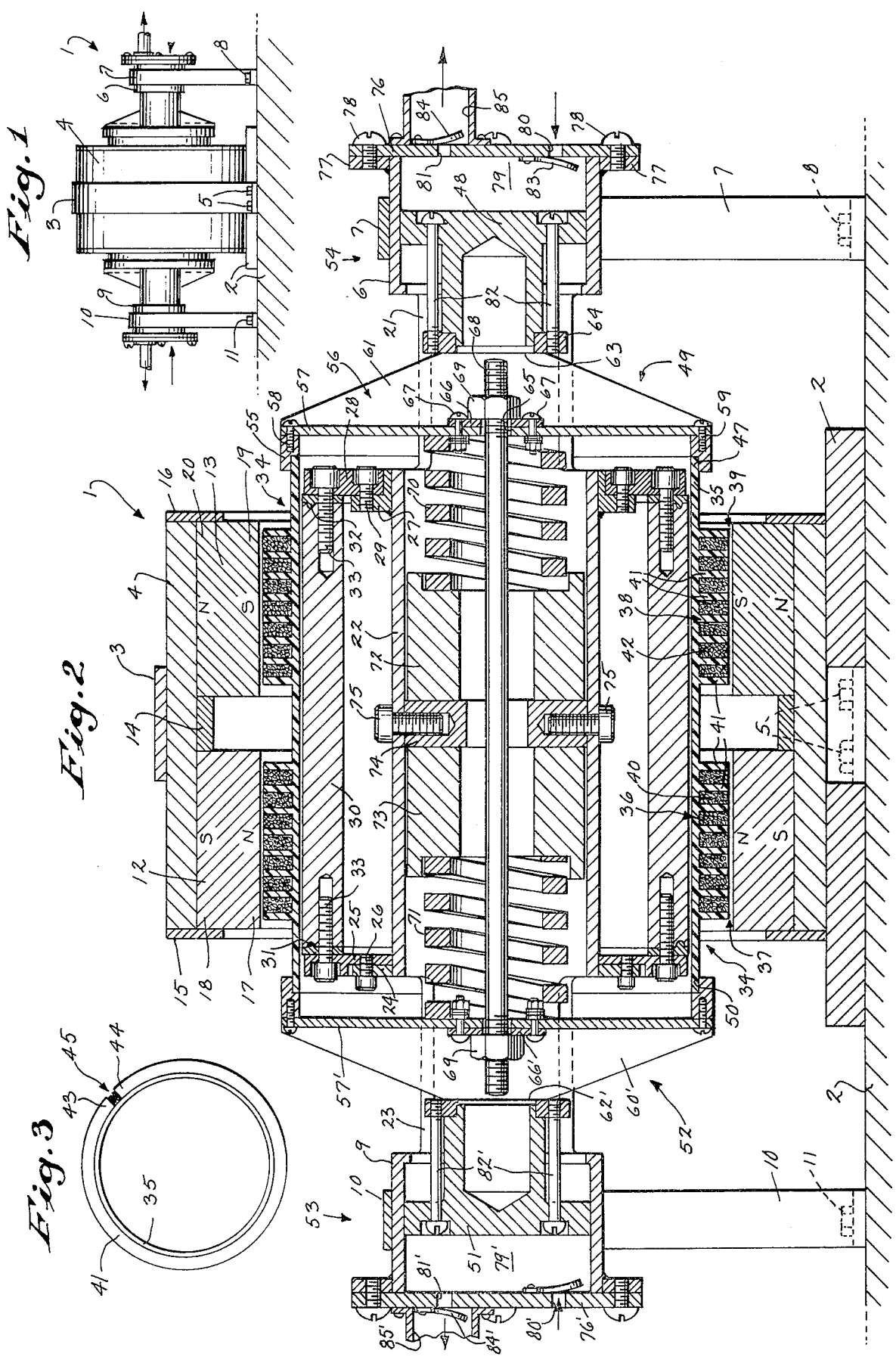

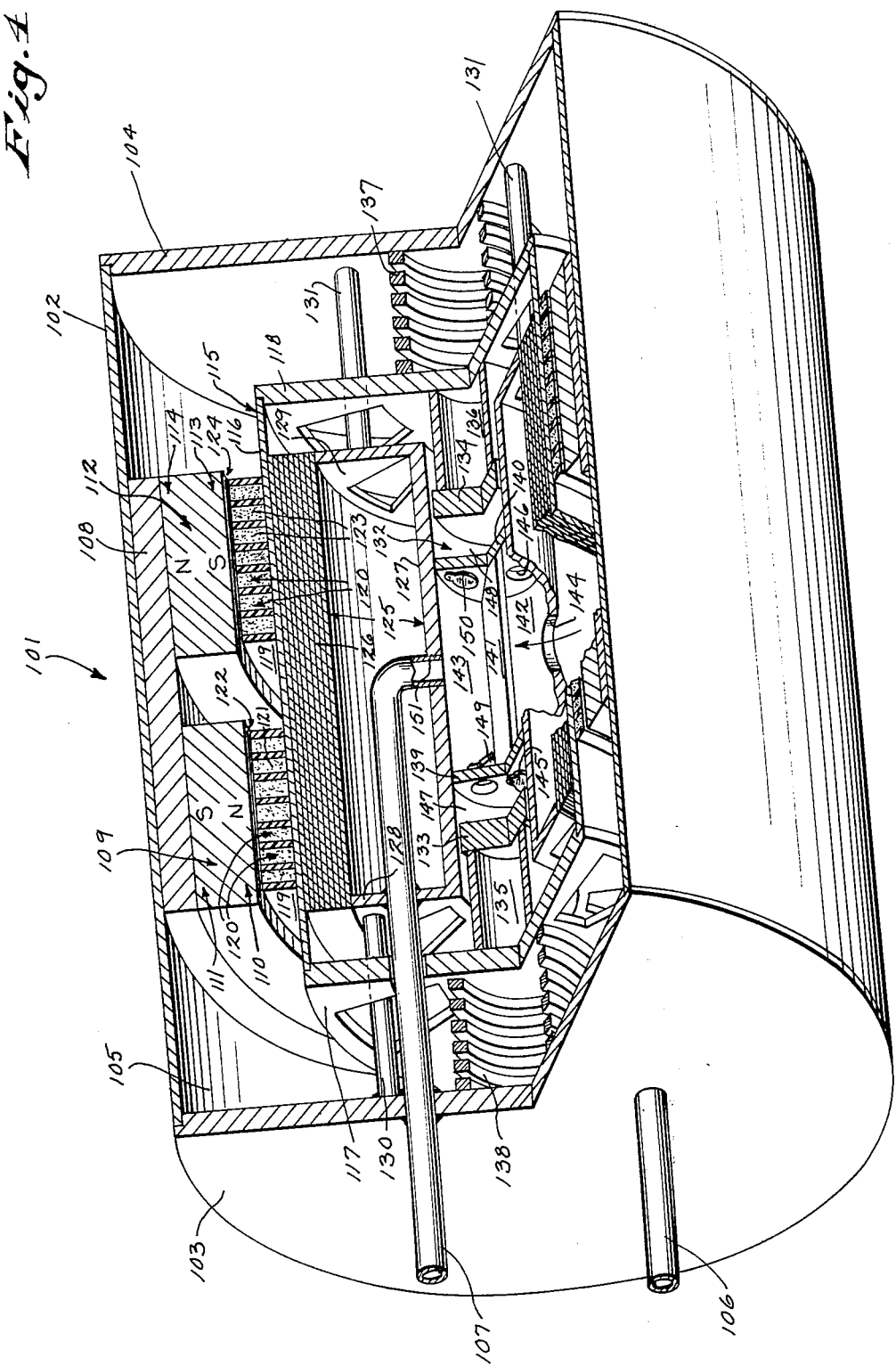

RECIPROCATING LINEAR MOTOR

BACKGROUND OF THE INVENTION

This invention relates to a linear motor which employs a plurality of permanent magnets to actuate an energized moving coil coupled to provide an oscillatory output.

Linear motors have been widely used when linear oscillatory outputs are desired, such as within electric shavers for example.

One known linear motor utilizes an oscillating coil for operating a double acting pump or compressor utilized within a small refrigerator such as shown in the U.S. Pat. No. 2,679,732 issued on June 1, 1954. Specifically, the U.S. Pat. No. 2,679,732 structure employs a permanent magnetic ring connected to a pair of pole shoes to form a pot-shaped magnet having an annular clearance for the oscillatory coil coupled through a piston rod to operate a pair of pistons operating within associated chambers selectively supplied with ammonia through pressure valves.

Another type of refrigerator compressor utilizing a linear motor has been disclosed in an article by J. Timmerman entitled VIBRATORS appearing in the Philips tech. Rev. 33, No. 8/9, pages 255–259 (published Jan. 25, 1974). The disclosed Philips linear motor utilizes a pair of oppositely wound movable coils providing opposing fields which interact with the magnetic field of an annular permanent magnet having axially spaced opposite poles. The disclosed Philips movable coils operate a single compressor while centrally located spiral springs are used to resonate the whole system at the mains frequency.

Another known linear motor for general application is disclosed in the U.S. Pat. No. 3,599,020 issued to Harris et al on Aug. 10, 1971 and utilizes moving coils providing fields which interact with the magnetic fields provided by a series of annularly spaced permanent magnets having circumferentially spaced poles each alternating in polarity from adjacent poles.

SUMMARY OF THE INVENTION

The invention relates to a linear motor which employs a pair of axially spaced permanent magnets providing magnetic fields which actuate an energized moving coil coupled to provide an oscillatory output.

The pair of annular permanent magnets are utilized in a unique manner to provide spaced first and second substantially annular poles having opposite polarities. The pair of annular magnets are maintained in a fixed, axially spaced orientation by a supporting structure which also provides a magnetic circuit between the pair of magnets. Movable coil means is supported for axial movement by the supporting means and is radially spaced from the first and second annular poles. The coil means includes a first coil portion which is magnetically coupled with the first annular pole and a second coil portion magnetically coupled with the second annular pole. An alternating current source is electrically connected through input means to the coil means to provide the oscillatory output.

The new and novel linear motor of the invention has been found to be highly desirable in operating a compressor such as used within a refrigerator or as an air-compressor although certain aspects of the invention are not so limited.

The linear motor oscillatory output is enhanced by external reaction forces provided by the selectively compressed gas within opposed compression chambers which are axially aligned with the pair of annular magnets. The pistons within the opposed chambers are thus also axially aligned with the pair of annular magnets and exert bi-directional resilient forces in response to the compressed gas to assist the oscillation of the coil means. Additional reactionary forces are provided by a pair of balanced coil springs which likewise provide opposed bi-directional resilience forces to assist the oscillation of the coil means. Both the bi-directional compressed gas forces and the bi-directional spring forces are delicately balanced in accordance with the mass of the moving output and the frequency of the electrical energization to provide optimum resonance for the system.

A movable coil form includes a cylindrically shaped member preferably made from plastic or other good electrical insulating material for retaining the first and second coil portions thereon. Each of the coil portions are retained within spaced channels provided on the outer surface of the coil form. A plurality of spaced split rings form arc-shaped elements which snuggly engage the outer circumferential surface of the coil form and extend in a radial direction therefrom. Such rings are desirably made of magnetically conductive material and are split to provide circumferentially spaced ends which are separated by several circumferential degrees to provide a gap therebetween. Such a separation gap is desirable for reducing the eddy currents which might otherwise be produced within a continuous ring. In addition, the gaps within the split-rings conveniently retain the coil leads which pass from one coil retaining channel to an adjacent coil retaining channel. The plurality of channels formed by the arc-shaped split rings are desirable to maintain a stable and uniform air gap between each coil portion and associated annular magnet.

In one embodiment, the pair of opposing compression chambers are centrally located to be radially aligned with the moving coils and thus also radially aligned with the permanent magnets. Such a construction provides a highly compact compressor structure.

The linear motor of the invention has been found to be highly desirable in operating a double acting compressor under balanced conditions although certain aspects of the invention are not so limited.

BRIEF DESCRIPTION OF THE DRAWINGS

The drawings furnished herewith illustrate the best modes presently contemplated by the inventor and clearly disclose the above advantages and features as well as others which will be readily understood from the detailed description thereof.

In the drawings:

FIG. 1 is a front elevational view of a linear motor of the invention;

FIG. 2 is an exposed view of the motor of FIG. 1 with the front section broken away;

FIG. 3 is a diagrammatic illustration of a coil form containing an arc-shaped split-ring with a coil retaining passage employed in the linear motor of FIGS. 1 and 2; and FIG. 4 is an alternative embodiment of a linear motor functioning to provide a refrigerant compressor.

DESCRIPTION OF THE PREFERRED ILLUSTRATED EMBODIMENT

The invention is directed to a linear motor compressor 1 retained on a support 2 by a band 3 surrounding an annular steel ring 4 and secured to the supporting structure 2 such as by bolts 5. An annular housing portion 6 is secured to the supporting structure 2 by a band 7 and securing bolts 8 while an annular housing portion 9 is secured to the supporting structure 2 by a band 10 and securing bolts 11. In actual construction, the annular steel ring 14 is supported by the base structure 2 while the bands 3, 7 and 10 stabilize the linear motor compressor 1.

An annular permanent magnet 12 and an annular permanent magnet 13 are axially separated from each other by an annular separator 14 and are fixedly connected to the inner radial wall of the annular steel ring 4 by magnetic attraction and by epoxy or a pair of annular connecting rings 15 and 16 secured by studs, bolts, welding or the like.

The annular permanent magnet 12 provides an annular north pole 17 spaced radially inward from an annular south pole 18 while the permanent magnet 13 provides an annular south pole 19 spaced radially inward from an annular north pole 10. In such a configuration, the north pole 17 is axially spaced from the south pole 19 while the south pole 18 is magnetically coupled through the annular ring 4 to the north pole 20. The annular ring 4 is preferably made of steel or other good magnetic flux conducting member.

The housing portions 6 and 9 are integrally joined to form a continuous housing including the annular housing portion 21, the annular housing portion 22 and the annular housing portion 23. The housing including the portions 6, 21, 22, 23 and 9 thus extend the length of the linear motor compressor 1 and is fixedly mounted to the supporting structure 2 by the bands 7 and 10.

An annular ring 24 is welded to an outer end of the housing portion 22 while an annular ring 25 abuts ring 24 and is secured thereto by a plurality of bolts 26. An annular ring 27 is welded to an end of the housing portion 22 opposite to ring 24 and removably engages another annular ring 28 which is secured thereto by a plurality of bolts 29. The outer radial portions of the annular rings 25 and 28 are connected to an annular supporting member 30 through locking rings 31 and 21, respectively, and secured thereto by a plurality of bolts 33. It is therefore quite evident that the main housing including the housing portion 22 is fixedly connected to rigidly retain the annular supporting member 30.

A movable coil form 34 is mounted for axial sliding engagement along the annular support member 30. The movable coil form 34 includes a plastic tube 35 having an annular configuration and including a first coil retaining portion 36 spaced from the north pole 17 to define an air gap 37 and a second coil retaining portion 38 spaced from the south pole 19 to define an air gap 39.

The coil retaining portion 36 includes an electrical coil 40 containing a first predetermined number of coil windings wound in a first direction and located between spaced annular split-rings 41. The coil retaining portion 38, on the other hand, includes a coil 42 containing a predetermined number of coil windings wound in a second direction opposite to said first direction and retained between a plurality of spaced split-rings 41. As shown in FIG. 3, each of the split-rings 41 is fixedly secured to the plastic cylinder 35 and includes a first end 43 circumferentially spaced a short distance from a second end 44 thereby providing a complete separation 45 which retains electrical leads 46 passing from one coil retaining channel to an adjacent coil retaining channel. The spaced separation provided by ends 43 and 44 of each split-ring 41 reduces the magnitude of induced eddy currents within the rings which might otherwise exist should such rings be completely annular.

An outer end 47 of the plastic tube 35 is connected to a compressor piston 48 located within housing portion 6 through a connector assembly 49. In like manner, an outer end 50 of the tube 35 is connected to a compressor piston 51 located within the housing portion 9 through a connecting assembly 52. The piston 51 operating within the housing portion 9 is part of a first compressor unit 53 while the piston 48 operating within the housing portion 6 is part of a second compressor unit 54 which is axially aligned with compressor unit 53 and the annular magnets 12 and 13. The compresor unit 54 and connecting structure 49 will be explained in detail while the elements forming the compressor unit 53 and connecting structure 52 are substantially similar and like elements will be identified by identical numbers primed.

The connecting structure 49 includes an annular ring 55 providing an annular recess which engages the end portion 47 of the plastic cylinder 35. A connecting member 56 includes a rectangular portion 57 which is secured to the angular ring 55 at an upper location by bolts or studs 58 and at a lower location by bolts or studs 59. A pair of spaced parallel portions 60 and 61 of member 56 are formed substantially normal to the rectangular portion 57 and provide spaced outer ends 62 and 63, respectively, which are welded to an annular ring 64.

The rectangular portion 57 of the connecting member 56 contains an annular opening 65 while an abutting annular ring 66 is bolted to the portion 57 by bolts 67. An axially located rod 68 having outer threaded end portions removably retain oppositely spaced nuts 69 which engage and transmit pressure to the rings 66 and 66' thereby rigidly interconnect the connecting structures 49 and 52 to the coil form 34.

The coil form 34 and the connecting structures 49 and 52 are mounted for axially oscillation. To facilitate such oscillations, a pair of coil springs 70 and 71 are mounted to bear against the rectangular portions 57 and 57', respectively, and further engage radially spaced annular supporting rings 72 and 73, respectively. The rings 72 and 73, in turn, are maintained in spaced relationship by an annular ring 74 which is secured to the integral housing portion 22 by a plurality of bolts 75.

The compressor structure 54 includes a circular flange 76 secured to the housing portion 6 through a plurality radially extending lugs 77 and bolts 78 to form a compressor chamber 79 retaining the piston 48. The chamber 79 receives a low pressure gas such as atmospheric air through an inlet 80 and selectively supplies high pressure gas through an outlet 81. The piston head 48 is connected through a plurality of bolts 82 to the annular ring 64 with external threads of each bolt 82 removably engaging internal threads providing by the ring 64. A one-way pressure operated valve 83 is located at inlet 80 and permits the passage of low pressure gas (such as atmospheric) into the chamber 79 when the piston 48 moves away from the flange 76. A one-way pressure operated valve 84 is located at the outlet 81 and permits the passage of high pressure gas from the chamber 79 to an outlet conduit 85 when the piston 48 moves toward the flange 76 and a predetermined pressure exists in chamber 79.

The electrical coils 40 are electrically connected in series with the electrical coils 42 and are further connected to output leads (not shown) for selective energization by a single-phase alternating current source (not shown) in a series type circuit. When energized, the coils 40 and 42 provide two separate alternating electromagnetic fields across the air gaps 37 and 39, respectively, which interact with two separate magnetic fields provided by the annular magnetic poles 17 and 19, respectively. Such interaction between the alternating electromagnetic fields and the permanent magnetic fields oscillates the coils 40 and 42 axially. The axial oscillatory movement of coils 40 and 42 thus imparts axial oscillatory motion to the piston heads 48 and 51 through the interconnecting structures 49 and 52 and the coil retaining cyclinder 35.

The oscillation of piston head 48 alternately opens and closes the pressure valves 83 and 84 in a cyclic manner to provide a pulsating high pressure output through the conduit 85.

The operation of piston head 51 is substantially similar but essentially 180° out of phase with respect to compressor 54. Thus, the output at conduit 85' consists of cyclic output pulses of compressed air which are 180° out of phase from the cyclic pulses supplied through the output 85. If desired, the outputs 85 and 85' could be coupled together to form a common output supplying a substantially continuous supply of compressed air.

The use of two axially spaced, balanced compressors with compression cycles essentially 180° out of phase have been found to be extremely desirable in facilitating the operation of the linear motor. The pair of balanced springs 70 and 71 each supply bi-directional forces during appropriate portions of the operating sequence to assist the alternating electromagnetic forces provided by the coils 40 and 42 in oscillating the coil form 35 and interconnected piston heads 48 and 51. As an example, rightward axial movement of the coil form 35 extends spring 70 while compressing spring 71 so that both springs function to provide a leftward axial reactionary force which increases as the coil form 35 moves to its maximum extended rightward position. In addition, the compressed air within the chamber 79 assists the operation of springs 70 and 71 by providing an additional leftward reactionary force in response to rightward movement of piston 48. In other words, the gas volume within chamber 79 behaves as a non-linear spring and assists the axial forces provided by springs 70 and 71. In like manner during the opposite half cycle of the operating sequence, the pressure within the chamber 79' facilitates the operation of springs 70 and 71.

The annular magnets 12 and 13 are advantageously positioned because they are immediately adjacent to the coils 40 and 42. Such novel positioning of the annular magnets insures that practically all of the magnetic flux acts on the coils to produce efficient output force.

A refrigerant compressor 101 is illustrated in FIG. 4 and includes a cylindrical casing 102 which is enclosed by circular end members 103 and 104 to form a cylindrically shaped internal chamber 105. An input pipe 106 is connected to end member 103 to supply low pressure Freon to the chamber area 105. An output pipe 107 passes through the end member 103 and conducts high pressure Freon for use in a domestic refrigerator or the like.

An annular ring 108 made of steel or other good magnetic flux conducting material is fixedly connected to the inner circumferential wall of the casing 102. An annular magnet 109 provides an annular north pole 110 spaced radially inward from an annular south pole 111, the latter fixedly connected to the inner circumferential surface of the annular member 108. A second permanent magnet 112 provides an annular south pole 113 spaced radially inward from an annular north pole 114, the latter fixedly connected to the inner circumferential surface of the annular member 108. The magnets 109 and 112 are thus maintained in axially spaced relationship and fixedly connected to the flux conducting annular member 108. In such manner, the assembly including the annular member 108 and the permanent magnets 109 and 112 provide two spaced annular magnetic poles 110 and 113 having opposite polarity which face radially inward to form a portion of the linear motor structure.

A movable coil form 115 includes an outer cylindrical member 116 and a pair of oppositely spaced end members 117 and 118 and is preferably made from a plastic material or the like. A plurality of arc-shaped split-rings 119 circumferentially surround the outer cylinderical surface 116 and are spaced to provide a plurality of spaced coil retaining channels 120, such as illustrated in FIG. 3 for the first embodiment. The channels 120 spaced adjacent to the north pole 110 contain a coil 121 having a predetermined number of turns wound in a first direction. The coil 121 and associated split-rings 119 are spaced from the pole 110 to form a gap 122 therebetween. In similar mannner, the channels 120 spaced adjacent to the south pole 113 retain a coil 123 having a predetermined number of turns wound in a second direction opposite to the first direction so that coil 123 and associated split-rings 119 are spaced from the south pole 113 to form an air gap 124.

A mounting structure 125 is centrally located within the compressor structure 101 and includes an outer cylindrical member 126 and an inner cylindrical member 127 interconnected by oppositely spaced annular end members 128 and 129. The end member 128 is fixedly connected to the outer end member 103 by a plurality of supports 130 while the end member 129 is fixedly connected to the outer end member 104 by a plurality of supports 131. The inner cylindrical surface of the coil form 116 is movably mounted about the outer cylindrical surface of the member 126 so that the coil form 115 is permitted to move axially. A cylindrically shaped opening 132 is provided within the inner cylindrical surface of the portion 127 and forms a compressor chamber movably retaining a pair of compressor pistons 133 and 134. The piston 133 is connected to the end member 117 by a cylindrical connector 135 while the piston 134 is connected to the end member 118 by a cylindrical connector 136.

The end member 118 is movably connected to the outer end member 104 by a coil spring 137 while the end member 117 is movably connected to the outer end wall 103 by a coil spring 138.

The cylindrical inner opening or chamber 132 contains a pair of spaced circular walls 139 and 140 interconnected by a connecting wall 141 to form an inlet chamber 142 and an output chamber 143. An opening 144 within the cylindrical member 127 allows low pressure Freon freely circulating within the chamber 105 to pass into the inlet chamber 142. The chamber walls 139 and 140 include low pressure inlet valves 145 and 146, respectively, which selectively permit low pressure Freon to enter into the compression chambers 147 and 148, respectively. The pistons 133 and 134 are selectively operated to compress gas within chambers 147 and 148 and thereafter selectively supplied when at a predetermied pressure to the outlet conduit 107 through outlet valves 149 and 150 retained in the end members 139 and 140, respectively, the output chamber 143, and outlet opening 151.

The refrigerant compressor 101 provides a distinct advantage in that low pressure Freon supplied to chamber 105 is permitted to flow in and about the linear motor structure for the purposes of cooling the elements. Thus, Freon is permitted to pass through the air gaps 122 and 124 and freely flow in and about the coils 121 and 123 and the permanent magnets 109 and 112.

The oppositely wound coils 121 and 123 are serially connected to a single phase alternating current source for selective energization to provide reciprocating movement of the coil form 115 thereby axially oscillating the compressor pistons 133 and 134. The reciprocating oscillation of pistons 133 and 134 alternately permits low pressure Freon to be supplied to the pressure chambers 147 and 148 through the input valves 145 and 146, respectively, and high pressure Freon to be supplied through the output valves 149 and 150 to exit through the tube 107.

The central location of the pair of pressure chambers 147 and 148 in a position radially aligned with the coil form structure 115 provides a highly desirable compact structure while the reactionary forces of compressed gas combine with the forces provided by the coil springs 137 and 138 to provide a resonant system in a unique linear motor application.

The linear motor of the present invention can thus be used within a highly novel motor-compressor application which provides a unitary moving structure consisting of the coils and associated arc-shaped coil retainers, the cylindrically coil form, the connecting members, and the pistons. In a practical application of the invention, the movable coil form including the plastic cylindrical form, the retained coils and the split-rings are epoxied together by an appropriate resinous material into a unitary enclosed structure. The balanced employment of a pair of coil springs with a pair of compressor chambers function to provide reactionary forces assisting the system resonance provided by electromagnetic interaction between the oppositely wound balanced pair of coils and the permanent magnetic fields provided by the pair of axially spaced annular magnets.

The spaced arc-shaped steel split-rings engaging the plastic coil form provide a highly desirable small but uniform air gap for the permanent magnetic flux to traverse. The separation within the split-rings provides reduction of induced eddy currents within such rings and also permits the leads of the retained coils to pass from one coil retaining channel to an adjacent coil retaining channel in a convenient manner.

The balancing of the two axially spaced, oppositely wound coils provides a substantially lower coil inductance because of the cancellation of opposing flux between such coils due to their oppositely wound configurations.

Various modes of carrying out the invention are contemplated as being within the scope of the following claims particularly pointing out and distinctly claiming the subject matter which is regarded as the invention.

I claim:

1. A linear motor, comprising permanent magnetic means including a first annular permanent magnet providing a first annular pole of a first magnetic polarity and a second annular permanent magnet providing a second annular pole of a second magnetic polarity opposed to said first polarity and axially spaced from said first pole, supporting means fixedly supporting said magnetic means and providing a magnetic circuit between said first and second magnets, coil means movably supported by said supporting means and radially spaced from said magnetic means and providing a first coil portion magnetically coupled with said first pole and a second coil portion magnetically coupled with said second pole, said coil means including a cylindrical electrical insulating member and a first plurality of spaced arc-shaped magnetically conductive members providing at least a first channel confining said first coil portion and a second plurality of spaced arc-shaped magnetically conductive members providing at least a second channel confining said second coil portion, input means selectively electrically connecting said coil means to an alternating current source, and output means operatively connected to said coil means and providing an oscillatory output in response to the energization of said coil means by said alternating current source.

2. The linear motor of claim 1, wherein said first and second spaced arc-shaped members provide a plurality of spaced coil retaining channels, one of said arc-shaped members providing a separation between opposite ends thereof.

3. The linear motor of claim 1, wherein said output means includes an output member axially aligned with said first and second annular poles and operatively connected to said cylindrical insulating member.

4. A linear motor, comprising a housing, a first annular permanent magnet having a first annular pole providing a first polarity and a second annular pole spaced radially outward from said first pole and providing a second polarity opposed to said first polarity, a second annular permanent magnet having a first annular pole providing said second polarity and a second annular pole spaced radially outward from said first pole and providing said first polarity, an annular member coupled to said housing and connecting said first and second magnets and completing a magnetic circuit between said second poles, a coil form operatively supported for movement by said housing and providing a cylindrical outer surface containing a first plurality of spaced arc-shaped projections providing a plurality of first channels confining a first coil wound in a first direction and spaced radially inward from said first magnet and a second plurality of spaced arc-shaped projections axially spaced from said first projection and providing a plurality of second channels confining a second coil wound in a second direction and spaced radially inward from said second magnet, an electrical input selectively serially connecting said first and second coils to an alternating current source, and a mechanical output connected to said coil form and providing oscillatory axial motion in response to the energization of said first and second coils by said alternating current source.

5. The linear motor of claim 4, wherein said housing includes first and second compressor chambers axially aligned with said first and second annular magnets and each including a low pressure gas inlet and a high pressure gas outlet, said mechanical output including first and second pistons slidably retained by said first and second chambers, respectfully, and axially reciprocated by said coil form for cyclically drawing low pressure gas into said chambers through said gas inlets and supplying high pressure gas through said gas outlets.

6. The linear motor of claim 5, wherein said first and second compressor chambers are radially aligned with said first and second annular magnets, respectfully.

* * * * *

UNITED STATES PATENT AND TRADEMARK OFFICE
CERTIFICATE OF CORRECTION

PATENT NO. : 4,002,935
DATED : January 11, 1977
INVENTOR(S) : John Robert Brauer It is certified that error appears in the above-identified patent and that said Letters Patent are hereby corrected as shown below:

Column 2, Line 41, Delete "in" and substitute therefor ---In---

Column 3, Line 26, Delete "10" and substitute therefor ---20---

Column 3, Line 48, Delete "21" and substitute therefor ---32---

Column 4, Line 22, Delete "compresor" and substitute therefor ---compressor---

Column 4, Line 66, Delete "providing" and substitute therefor ---provided---

Column 10, Line 3, Delete "respectfully" and substitute therefor ---respectively---
CLAIM 5

Column 10, Line 9, Delete "respectfully" and substitute therefor ---respectively---
CLAIM 6

Signed and Sealed this twelfth Day of July 1977

[SEAL]

Attest:

RUTH C. MASON
Attesting Officer

C. MARSHALL DANN
Commissioner of Patents and Trademarks